United States Patent
Manda (10) Patent No.: US 10,757,277 B2
(45) Date of Patent: Aug. 25, 2020

(54) IMAGE FORMING APPARATUS AND ELECTRONIC DEVICE FOR DISPLAYING SAMPLE IMAGE SUBJECTED TO PICTURE QUALITY ADJUSTMENT, AND IMAGE FORMING SYSTEM INCLUDING IMAGE FORMING APPARATUS AND ELECTRONIC APPARATUS

(71) Applicant: KYOCERA Document Solutions Inc., Osaka (JP)

(72) Inventor: Etsuko Manda, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/418,072

(22) Filed: May 21, 2019

(65) Prior Publication Data
US 2019/0373121 A1    Dec. 5, 2019

(30) Foreign Application Priority Data
May 31, 2018 (JP) ................. 2018-104873

(51) Int. Cl.
*H04N 1/00* (2006.01)
*H04N 1/23* (2006.01)

(52) U.S. Cl.
CPC ....... *H04N 1/00411* (2013.01); *H04N 1/0044* (2013.01); *H04N 1/00129* (2013.01); *H04N 1/2392* (2013.01)

(58) Field of Classification Search
CPC ........... H04N 1/00161; H04N 1/00164; H04N 1/0044; H04N 1/00442; H04N 1/00445; H04N 1/0045; H04N 1/00411; H04N 1/00129; H04N 1/2392; H04N 2201/0094; G06F 3/1208; G06F 3/1256; G06F 3/1292; G06F 3/1205; G06F 3/1253
See application file for complete search history.

(56) References Cited

U.S. PATENT DOCUMENTS

2013/0321651 A1* 12/2013 Ichikawa ........... H04N 1/00209
                                                               348/207.1
2015/0237225 A1    8/2015 Tanaka et al.

FOREIGN PATENT DOCUMENTS

JP        2015-154367 A    8/2015

* cited by examiner

*Primary Examiner* — Kent Yip
(74) *Attorney, Agent, or Firm* — IP Business Solutions, LLC (57) ABSTRACT

An electronic device includes an imaging unit, a display unit, and a control unit. The imaging unit acquires a distinction image, visualized from setup information including a set value set by a user, with respect to a parameter for picture quality adjustment to be performed by an image forming apparatus. The control unit includes a processor, and recognizes, when the processor executes a control program, the setup information on a basis of the distinction image acquired by the imaging unit, and causes the display unit to display a first image formed by subjecting a sample image to the picture quality adjustment, according to the set value included in the setup information, and a second image formed by subjecting the sample image to the picture quality adjustment, according to a set value different from the set value included in the setup information.

5 Claims, 12 Drawing Sheets

Fig.7B

IMAGE FORMING APPARATUS AND ELECTRONIC DEVICE FOR DISPLAYING SAMPLE IMAGE SUBJECTED TO PICTURE QUALITY ADJUSTMENT, AND IMAGE FORMING SYSTEM INCLUDING IMAGE FORMING APPARATUS AND ELECTRONIC APPARATUS

INCORPORATION BY REFERENCE

This application claims priority to Japanese Patent Application No. 2018-104873 filed on May 31, 2018, the entire contents of which are incorporated by reference herein.

BACKGROUND

The present disclosure relates to an electronic device to be used in combination with an image forming apparatus configured to adjust picture quality when outputting an image formed on a recording medium, and an image forming system including the electronic device and the image forming apparatus.

Some image forming apparatuses that output an image formed on a recording medium (sheet) are configured to adjust the picture quality of the original image (image data), to improve the appearance of the outputted image. For example, luminance and contrast are items to be adjusted through the picture quality adjustment, and when a color image is handled, for example chroma may also be adjusted. It is preferable to optimally adjust such items, with respect to the image that the user intends to output. To do so, it may be possible to actually output the image on the sheet, for the user to confirm the result, which, however, leads to waste of the sheets and time. Accordingly, it is preferable to display a preview of the content to be outputted. In this case, the user can visually confirm the preview image, before actually outputting the image formed on the sheet.

However, since the screen (display unit) provided in conventional image forming apparatuses is small, and only has low resolution, it is difficult to confirm the effect of the adjustment. Besides, a color display is unnecessary in the normal operation of the image forming apparatus, and therefore the display is often configured to display only a B/W image. In such a case, the preview display of a color image is unavailable, and consequently the effect of the adjustment of an item characteristic of the color image, such as chroma, is unable to be confirmed.

Accordingly, an image processing system, constituted of a combination of an image forming apparatus (image processing unit) and an electronic device (mobile terminal, smartphone, or the like) capable of displaying an image, has been developed. The image forming apparatus employed in such an image processing system is configured to display the detail of the adjustment on the screen, so as to allow the user to visually recognize, together with a marker (e.g., two-dimensional code) corresponding to the detail of the adjustment. On the part of the electronic device, an imaging unit is provided, so that by shooting the marker displayed on the screen of the image forming apparatus, the electronic device can recognize the detail of the adjustment. The electronic device possesses image data for confirming the effect of the picture adjustment (picture adjustment effect display data), apart from the image outputted by the image forming apparatus as above. Then the picture adjustment effect display data, reflecting the detail of the adjustment recognized as above, is displayed on the screen on the part of the electronic device, as the preview image.

Normally, the screen (display unit) incorporated in an electronic device, such as a smartphone, is configured to display color images in high resolution, and a desired portion of the displayed image can be easily enlarged. Thus, by the mentioned combination of the electronic device and the image processing unit, the user can easily recognize the effect of the picture quality adjustment, using the electronic device. In this case, further, the exchange of information between the image processing unit and the electronic device can be achieved simply by shooting the marker, which is quite easy to operate, and can be performed even when the image processing unit is not connected to a network.

SUMMARY

The disclosure proposes further improvement of the foregoing technique.

In an aspect, the disclosure provides an electronic device including an imaging unit, a display unit, and a control unit. The imaging unit acquires a distinction image, visualized from setup information including a set value set by a user, with respect to a parameter for picture quality adjustment to be performed by an image forming apparatus. The control unit includes a processor, and recognizes, when the processor executes a control program, the setup information on a basis of the distinction image acquired by the imaging unit, and causes the display unit to display a first image formed by subjecting a sample image to the picture quality adjustment based on the set value included in the setup information, and a second image formed by subjecting the sample image to the picture quality adjustment based on a set value different from the set value included in the setup information.

In another aspect, the disclosure provides an image forming system including an image forming apparatus and an electronic device. The image forming apparatus includes an image forming unit, a first operation panel, a first display unit, and a first control unit. The image forming unit forms an image on a recording medium. The first control unit includes a processor, and generates, when the processor executes a control program, a distinction image, visualized from setup information including a set value set by a user through the first operation panel, with respect to a parameter for picture quality adjustment to be performed with respect to the image, and causes the first display unit to display the distinction image. The electronic device includes an imaging unit, a second display unit, and a second control unit. The imaging unit acquires the distinction image displayed on the first display unit. The second control unit includes a processor, and recognizes, when the processor executes a control program, the setup information on a basis of the distinction image acquired by the imaging unit, and causes the second display unit to display a first image formed by subjecting a sample image to the picture quality adjustment based on the set value included in the setup information, and a second image formed by subjecting the sample image to the picture quality adjustment based on a set value different from the set value included in the setup information.

DETAILED DESCRIPTION

Figure 1:
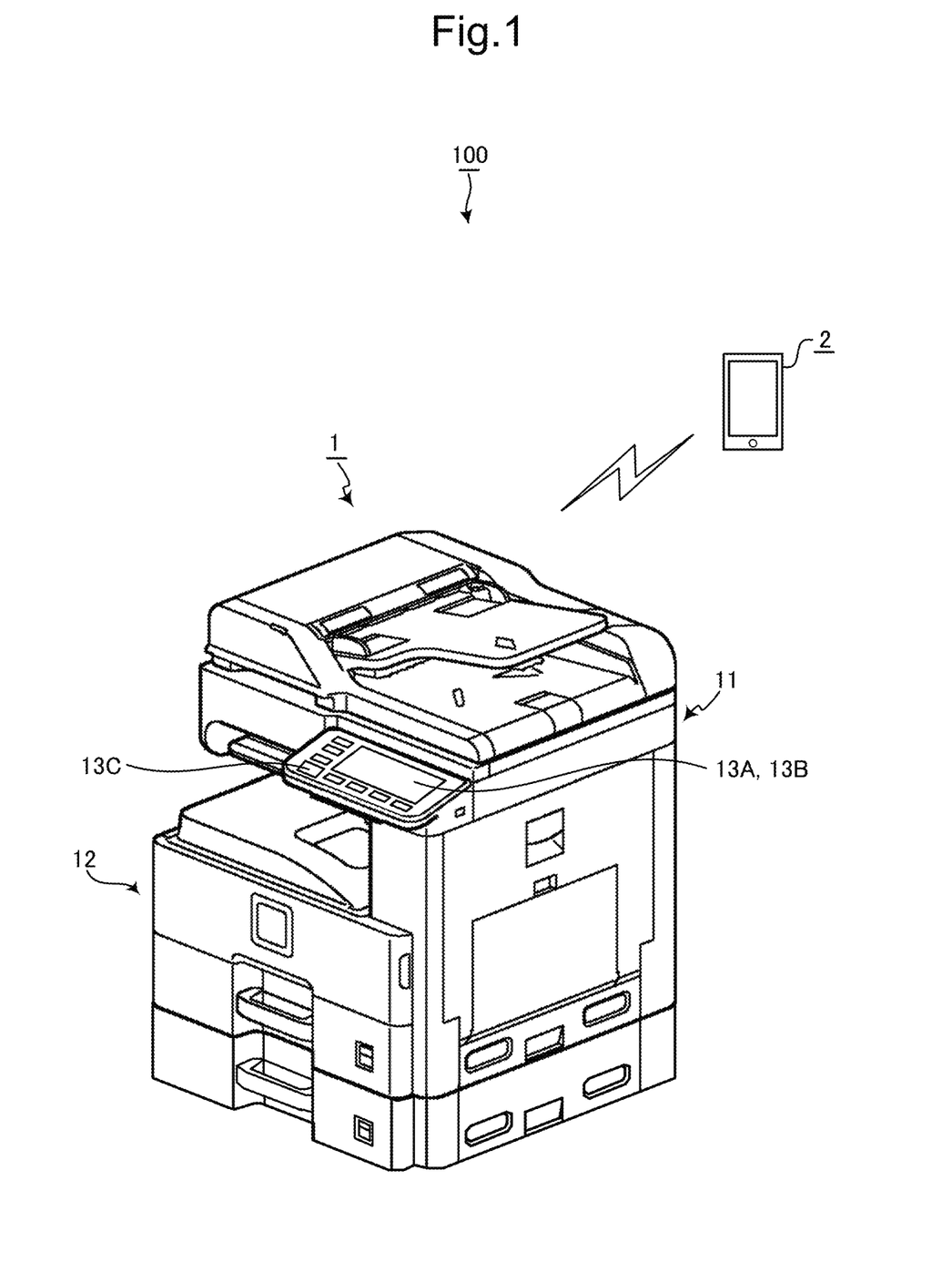
FIG. 1 is a schematic perspective view showing a configuration of an image forming system according to an embodiment of the disclosure.

Hereafter, an image forming apparatus, an electronic device, and an image forming system according to an embodiment of the disclosure will be described. FIG. 1 is a schematic perspective view showing a configuration of the image forming system according to the embodiment of the disclosure. The image forming system 100 includes the image forming apparatus 1 that outputs a color image formed on a recording medium (printing output), and a mobile terminal (electronic device) 2 independent from the image forming apparatus 1. Although the image forming apparatus 1 and the mobile terminal 2 both include a display unit (screen), the display unit of the mobile terminal 2 has higher resolution. In addition, the mobile terminal 2 includes an imaging unit for shooting an object. The mobile terminal 2 may be connected to the image forming apparatus 1 via a network, which, though, is not mandatory.

Figure 2:
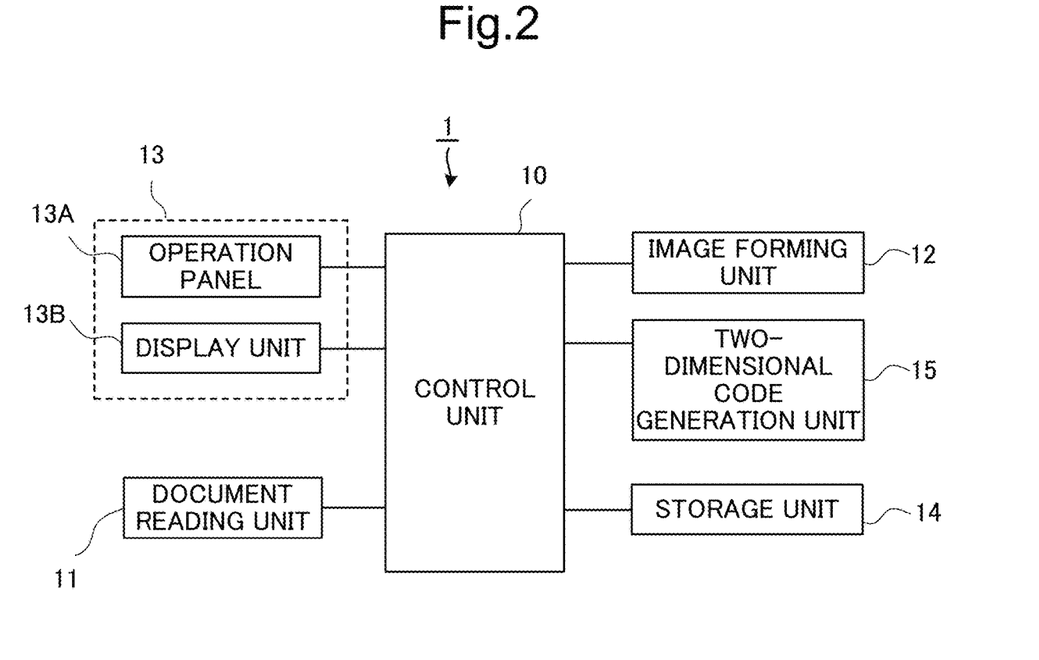
FIG. 2 is a block diagram showing a configuration of an image forming apparatus incorporated in the image forming system according to the embodiment of the disclosure.

The embodiment of the disclosure will be described hereunder, with reference to the drawings. FIG. 2 is a block diagram showing a configuration of the image forming apparatus 1, constituting one part of the image forming system. The image forming apparatus 1 has a copying function including optically reading an image formed on a source document, forming the image on another sheet, and outputting the sheet with the image formed thereon. Although the image forming apparatus 1 also has, in addition to the copying function, a printing function to perform printing output according to a printing job received from a personal computer connected via a network, or a document file or image file stored in a storage medium (e.g., USB memory) connected to the image forming apparatus 1, and a facsimile communication function, the subsequent description will focus on the case where the copying function is performed.

The image forming apparatus 1 includes a document reading unit 11 that optically reads an image in a source document placed thereon and acquires image data (image file). In addition, the image forming apparatus 1 includes an image forming unit 12 that forms the image that has been read on a new sheet, and outputs the image formed thereon. A control unit (first control unit) 10 controls the document reading unit 11 and the image forming unit 12, to perform the copying function. The image forming unit 12 includes a mechanism to form a toner pattern on the sheet, a mechanism to heat and press the sheet on which the toner pattern has been formed, to thereby fix the toner pattern, and a mechanism to transport the sheet through the mentioned mechanisms, at a speed controlled to allow the mechanisms to perform the operation. The image forming apparatus 1 includes the control unit 10 having a processor, and configured to control the overall operation of the image forming apparatus 1, and act as a two-dimensional code generation unit 15, when the processor executes a control program stored in a storage unit 14.

The user can operate an operation panel (first operation panel) 13A constituted of a touch panel, and a plurality of operation keys 13C, to input desired settings, in response to which various types of information is displayed on a display unit (first display unit) 13B having a screen. Actually, the operation panel 13A and the display unit 13B are integrated into a touch panel display (first touch panel display) 13, and incorporated in the image forming apparatus 1. Further, when performing the control of the image forming apparatus 1, the control unit 10 can look up various data stored in the storage unit (first storage unit) 14, constituted of a non-volatile memory or a hard disk.

Figure 3:
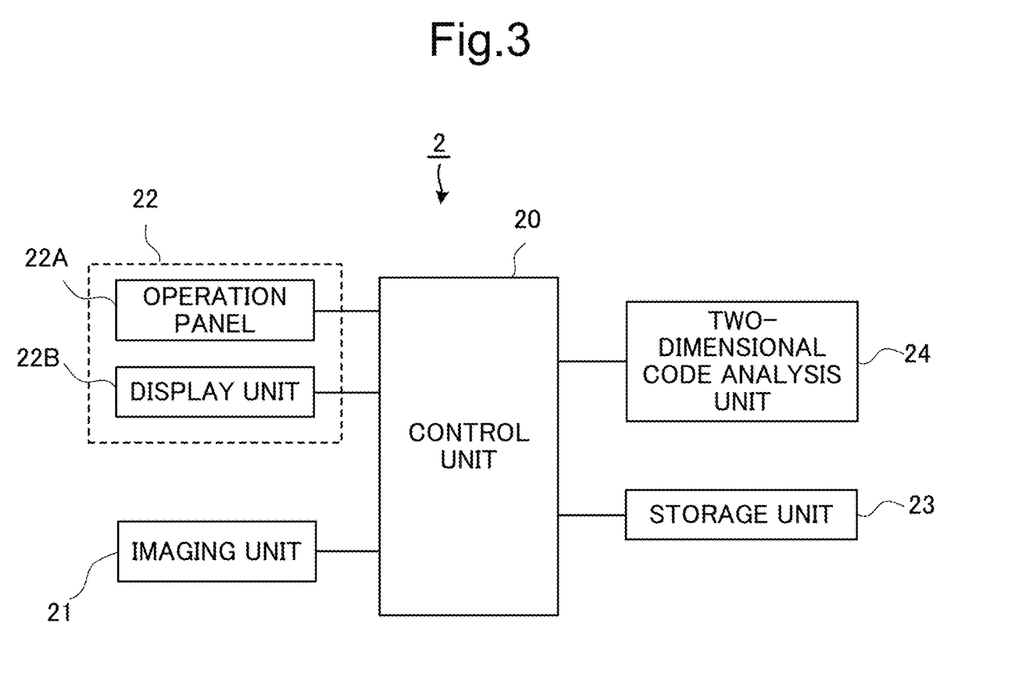
FIG. 3 is a block diagram showing a configuration of a mobile terminal (electronic device) incorporated in the image forming system according to the embodiment of the disclosure.

FIG. 3 is a block diagram showing a configuration of the mobile terminal (electronic device) 2, constituting the other part of the image forming system. The mobile terminal 2 includes an imaging unit 21 that shoots an object and acquires the image data (image file) of the object. The mobile terminal 2 also includes, like the image forming apparatus 1, an operation panel (second operation panel) 22A and a display unit (second display unit) 22B, which are also integrated into a touch panel display (second touch panel display) 22 and incorporated in the mobile terminal 2. Further, the mobile terminal 2 includes a storage unit (second storage unit) 23 for storing the image file and various other data, and a control unit (second control unit) 20 that controls the overall operation of the mobile terminal 2. The control unit 20 includes a processor, and is configured to control the overall operation of the image forming apparatus 1, and act as a two-dimensional code analysis unit 24, when the processor executes a control program stored in a storage unit 23.

The display unit 22B has higher resolution than that of the display unit 13B on the part of the image forming apparatus 1, and is capable of displaying a color image. In contrast, the display unit 13B has low resolution and is configured to display only a B/W image, because the display unit 13B is mainly used to operate the image forming apparatus 1 (e.g., setting various parameters), in collaboration with the operation panel 13A. The mobile terminal 2 can be exemplified by a smartphone.

When the image forming apparatus 1 is about to cause the image forming unit 12 to actually output a printed material, the user can designate a set value for various parameters for adjusting the picture quality, through the operation panel 13A. Examples of such parameters include luminance and chroma of the image. The set values for the parameters are optimized according to the image to be outputted, by the user. The set values are inputted through the touch panel display 13 (operation panel 13A and display unit 13B). In this process, the user can visually confirm the image to be outputted under the setting of the parameters, to thereby decide which set value is more preferable. For this purpose, it may be possible to cause the image forming unit 12 to actually output the image (form the image on the sheet), according to the values inputted by the user. In this case, however, many sheets and much time are wasted.

Accordingly, the image forming system 100 displays the image based on the parameters set by the user on the screen, instead of outputting the image formed on the sheet. However, as mentioned above, the display unit 13B is unable to present an image of a sufficient quality level that allows the user to check the appearance of the image. Therefore, the image is displayed on the display unit 22B of the mobile terminal 2 instead. It should be noted, however, that the image displayed on the display unit 22B is not the image to be actually outputted by the image forming apparatus 1 (in the case of the copying function, the image read by the document reading unit 11), but an image stored in advance in the storage unit 23, as an image file of sample images. Accordingly, when the mobile terminal 2 is about to display the image, it is necessary for the mobile terminal 2 to acquire the information related to the set values of the parameters (setup information) from the image forming apparatus 1, though it is unnecessary to acquire the image (image file) from the image forming apparatus 1.

In the image forming apparatus 1, the setup information is converted to a QR code (registered trademark) by the two-dimensional code generation unit 15 shown in FIG. 2, and the QR code is displayed on the display unit 13B. Accordingly, the mobile terminal 2 can shoot the QR code displayed on the display unit 13B, thereby acquiring the QR code as the image file, so that the control unit 20 acts as the two-dimensional code analysis unit 24 shown in FIG. 3, to recognize the original setup information. The control unit 20 stores the setup information or the QR code, in the storage unit 23. Thus, the sample image is subjected to the picture quality adjustment, on the basis of the set value included in the setup information, and the adjusted image can be displayed on the display unit 22B. As already mentioned, the display unit 22B is capable of displaying the image in such a quality that enables distinction of a difference between pictures, originating from a difference of the set values of the parameter. In addition, as is known regarding the popular smartphone, a specific portion of the image can be easily enlarged, by performing a pinch-out operation on the touch panel display 22. Therefore, the user can decide whether the setting of the parameter provides a satisfactory effect, through the mobile terminal 2.

The foregoing procedure can be performed with a known technique. In this embodiment, however, the information delivered from the image forming apparatus 1 to the mobile terminal 2 in the form of the QR code can contain a plurality of pieces of setup information, which represent different set values of the parameter. In addition, a plurality of different images are stored as sample images, in the storage unit 23. Thus, the control unit 10 can include, in the setup information, the information for specifying (selecting) a sample image that facilitates distinction of the difference among the plurality of images, subjected to the picture quality adjustment based on each of the plurality of pieces of setup information.

The control unit 20 on the part of the mobile terminal 2 can extract the sample image specified on the basis of the setup information, out of the plurality of sample images stored in the storage unit 23, and cause the display unit 22B to display the sample images, extracted and then subjected to the picture quality adjustment based on each of the plurality of pieces of setup information. In particular, the display unit 22B can simultaneously display those sample images.

Figure 4A:
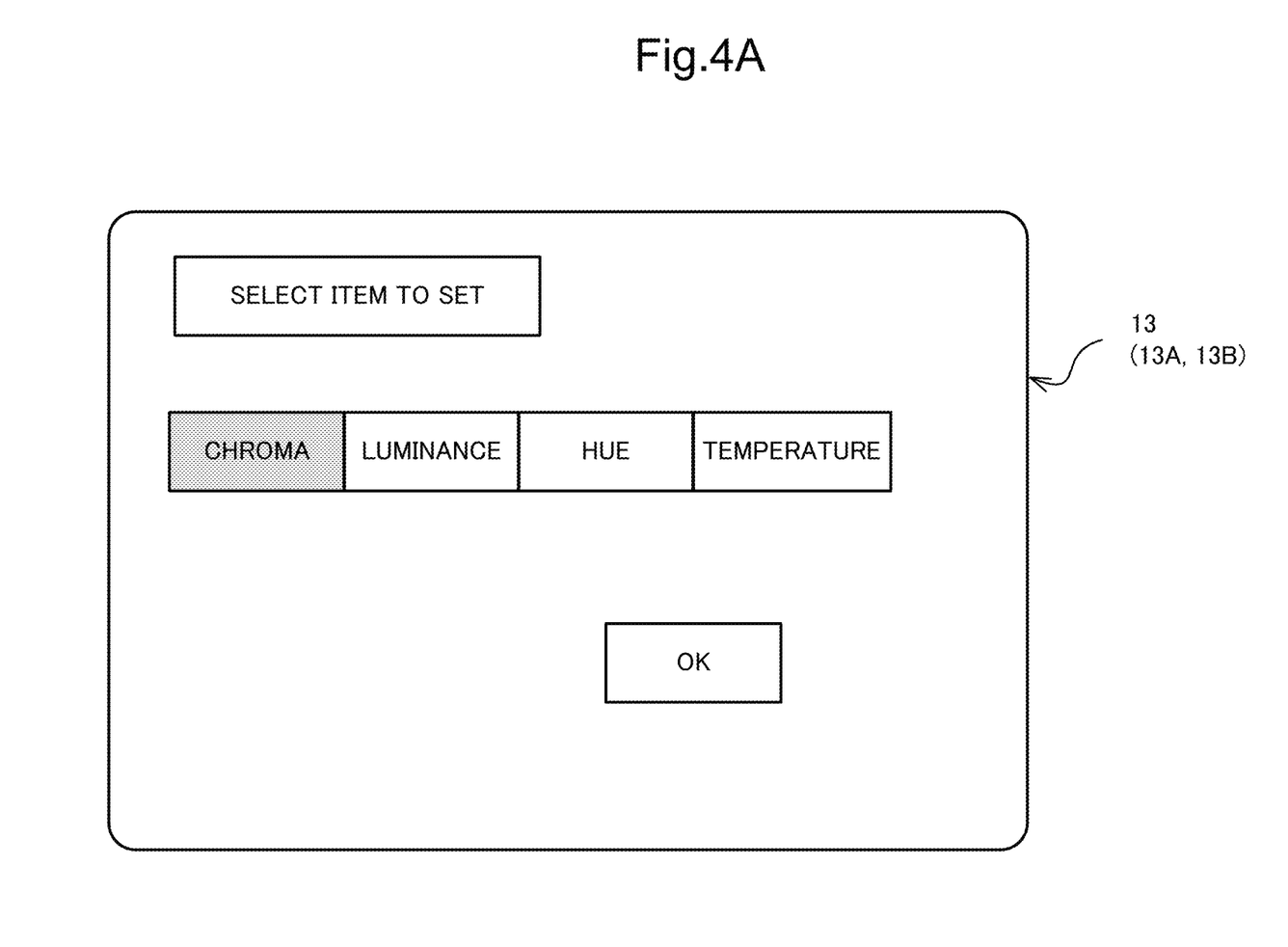
FIG. 4A and FIG. 4B are schematic drawings each showing a first example of a display on the part of the image forming apparatus.
Figure 4B:
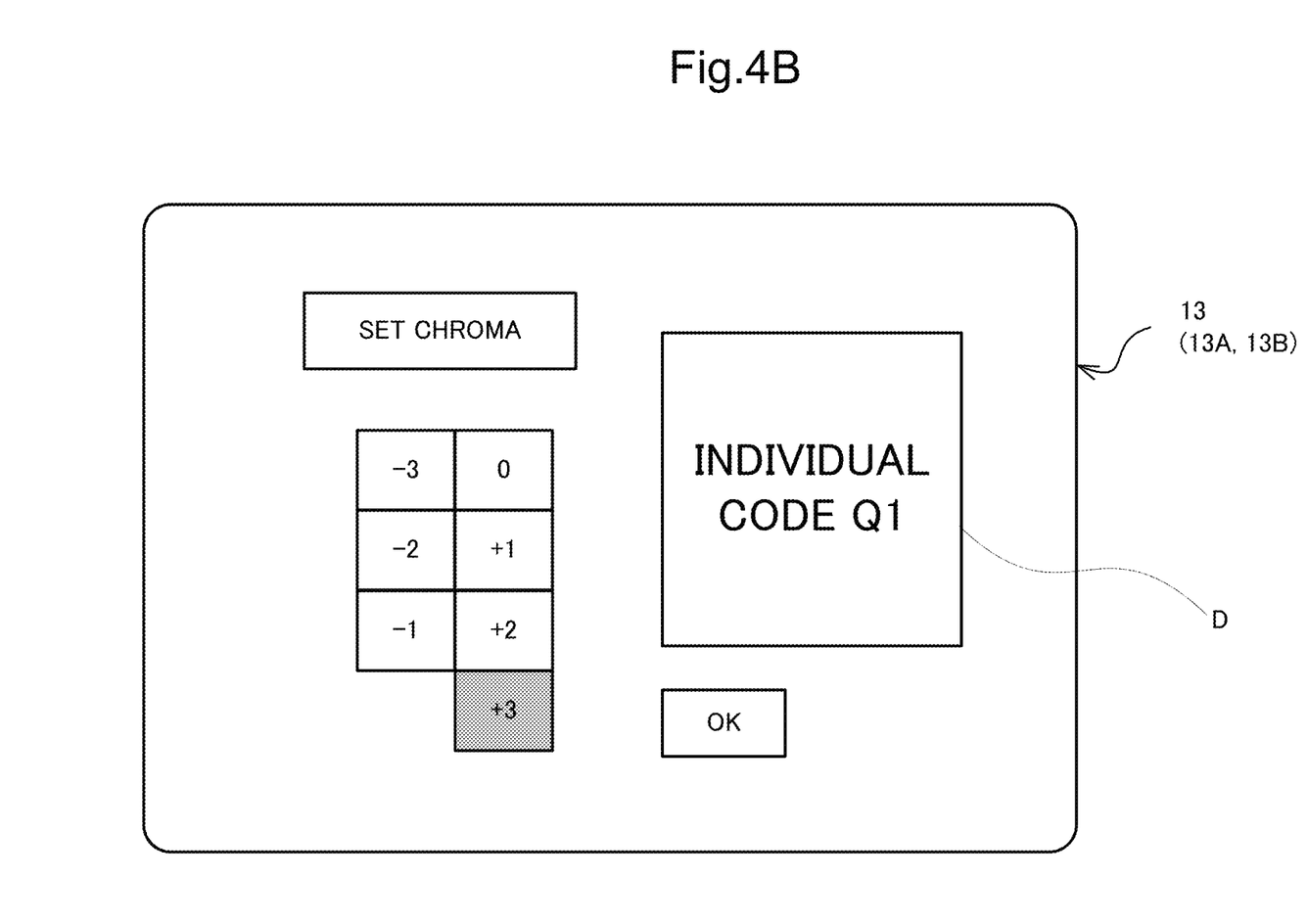

Hereunder, a specific operation performed by the image forming system 100 will be described. FIG. 4A and FIG. 4B illustrate a first example, representing the case where, in the image forming apparatus 1, the parameter is set through the display unit 13B (touch panel display 13), and the QR code corresponding to the setting is displayed. In this example, it is assumed that "chroma", "luminance", "hue", and "temperature" are prepared as items of the parameter. These items are set by a numeral, the value "0" corresponding to a default value (initial value). When all the items are set to "0", no picture quality adjustment is to be made.

FIG. 4A illustrates a screen asking the user which of "chroma", "luminance", "hue", and "temperature" is to be adjusted. In this example, "chroma" is selected by touching the operation panel 13A, and when the "OK" key is pressed the selection is entered. Then the display proceeds to the setting screen of "chroma" as shown in FIG. 4B, so that the user can select a set value from −3 to +3 on the operation panel 13A, and enter the selection by pressing the "OK" key. In this example "+3" is selected, and therefore "+3" is highlighted. In a distinction image display field D in the right region of the screen, an individual code Q1, encoded from the setup information indicating that "chroma" has been set to "+3", is displayed. Although FIG. 4B expresses the letters "Individual Code Q1", actually a B/W two-dimensional image (distinction image), formed as the QR code, is displayed. Therefore, the mobile terminal 2 acquires the image of the individual code Q1 with the imaging unit 21, and the control unit 20 acts as the two-dimensional code analysis unit 24, to recognize that the setup information indicates that "chroma" has been set to "+3".

Figure 5A:
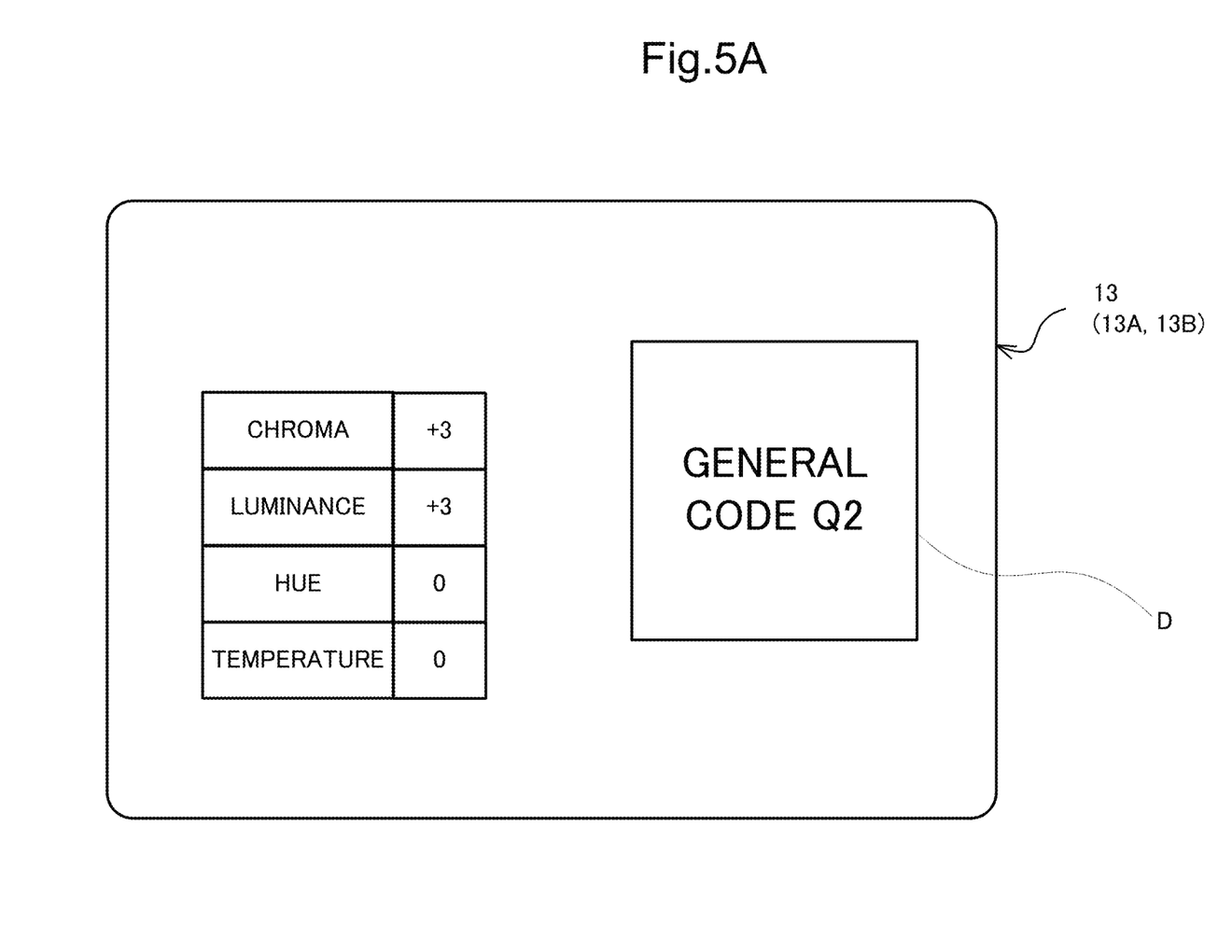
FIG. 5A is a schematic drawing showing a second example of the display on the part of the image forming apparatus.

FIG. 5A illustrates a second example, representing the case where the setup information is specified not with respect to each of the items of the parameter as above, but as a group of data including a combination of the set values of the respective parameters. In this case, each of the items is specified through the process shown in FIG. 4A and FIG. 4B, and the entered values of all the items are displayed. More specifically, the distinction image display field D displays a "General Code Q2", encoded from the setup information indicating that "chroma" has been set to +3, "luminance" has been set to +3, "hue" has been set to 0, and "temperature" has been set to 0.

Figure 5B:
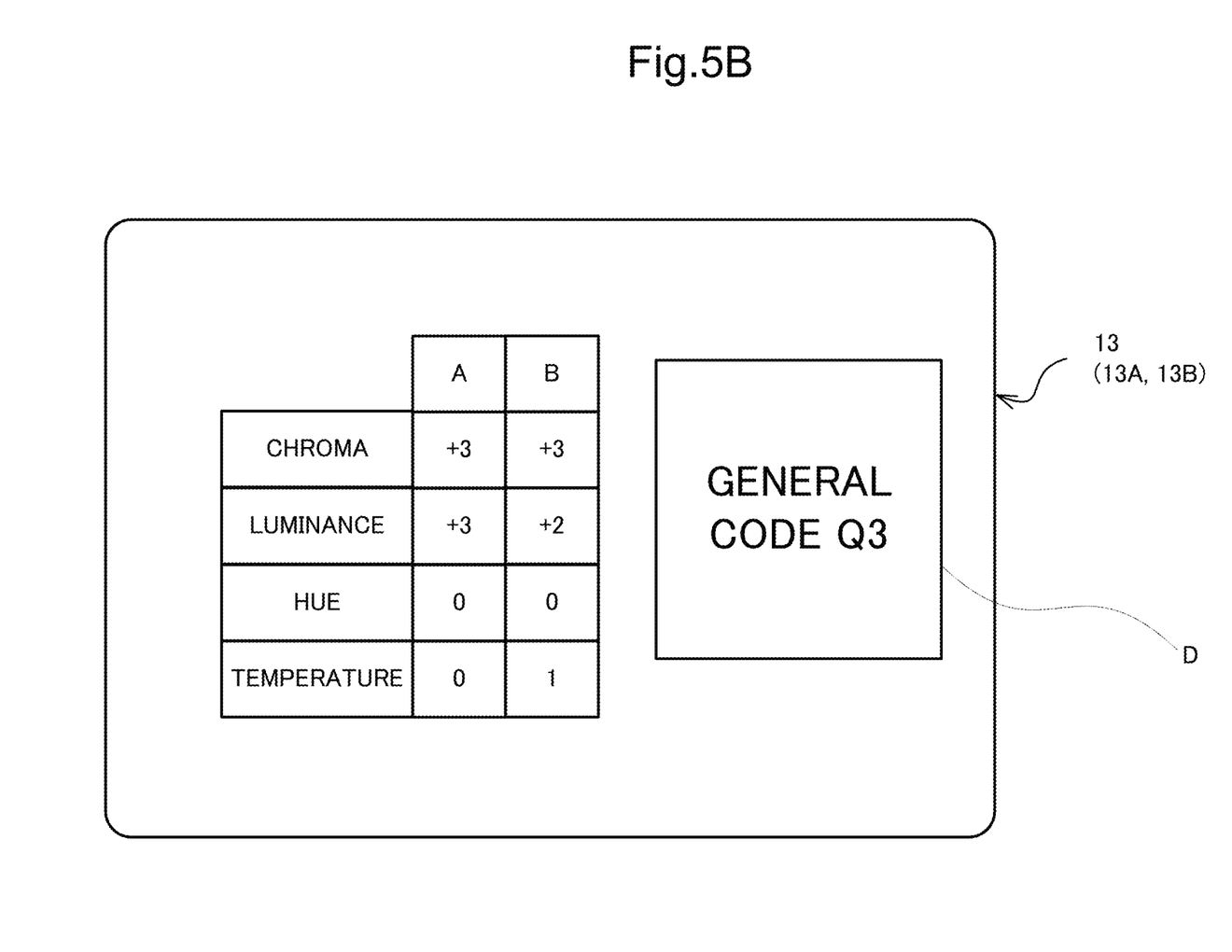
FIG. 5B is a schematic drawing showing a third example of the display on the part of the image forming apparatus.

FIG. 5B illustrates a third example, representing the case where two types of combinations of the set values of the parameter are set as the setup information. Making up two types of combinations is especially effective, when optimizing the picture quality adjustment. In this example, a first combination A and a second combination B shown in FIG. 5B are set, and the setup information corresponding to such settings is encoded, so that a "General Code Q3" is displayed in the distinction image display field D.

Figure 5C:
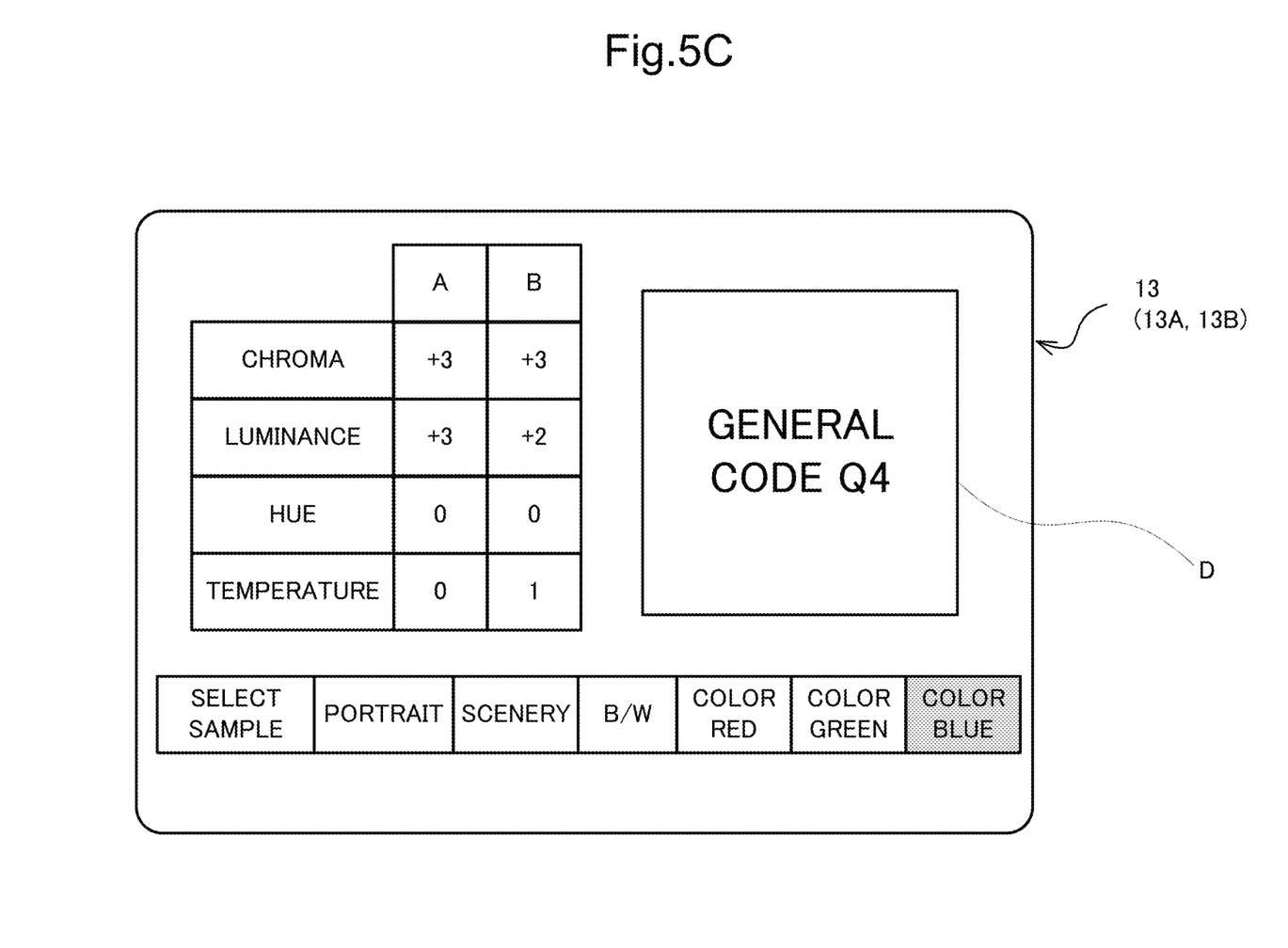
FIG. 5C is a schematic drawing showing a fourth example of the display on the part of the image forming apparatus.

FIG. 5C illustrates a fourth example, in which a field for selecting a sample image is displayed, in addition to the information similar to that of FIG. 5B (combination A and combination B), for the user to select one of the plurality of sample images stored in the storage unit 23 of the mobile terminal 2. In other words, the user can select one of the sample images, to be used for the picture quality adjustment with respect to the image to be outputted by the image forming apparatus 1. The field for selection displays items of "portrait", "scenery", "B/W", "color red", "color green", and "color blue", which respectively correspond to the case where the main object of the image is a person, where the main object is a scenery, where the image is a B/W image, where the image is a color image in which red is dominant, where the image is a color image in which green is dominant, and where the image is a color image in which blue is dominant. In the example shown in FIG. 5C, "color blue" is selected. In this case, the setup information including the combination A and the combination B, and the information indicating that "color blue" has been selected as the sample image, is encoded into a "General Code Q4", and displayed in the distinction image display field D.

In this case, the sample images appropriate for the picture quality adjustment applicable to the respective items of "portrait", "scenery", "B/W", "color red", "color green", and "color blue", are stored in advance in the storage unit 23 on the part of the mobile terminal 2. For example, six types of sample images are stored, so that a sample image featuring a human's face is used when "portrait" is selected, a sample image featuring a scenery is used when "scenery" is selected, and a sample image representing the corresponding tone is used, when one of "B/W", "color red", "color green", and "color blue" is selected. Here, although the user can select the sample image on the side of the image forming apparatus 1, as is the case with the setting shown in FIG. 4A and FIG. 4B, the control unit 10 may be configured to automatically select the sample image, upon recognizing the type of the image. In the case of "portrait" and "scenery", a known pattern recognition method can be employed, to decide which type is more appropriate. Regarding "B/W", "color red", "color green", and "color blue", the control unit 10 may recognize the color information of the image to be outputted by the image forming apparatus 1, to select the sample image.

Referring to FIG. 5C, further, instead of selecting one of "portrait", "scenery", "B/W", "color red", "color green", and "color blue", either of "portrait" and "scenery", and one of "B/W", "color red", "color green", and "color blue" may be selected separately. In this case, eight types (2×4) of sample images may be prepared so as to correspond to the combination of the selection, instead of six types as above. Thus, the number (types) of the sample images may be modified as desired, depending on the types or number of the items to be selected.

Figure 6A:
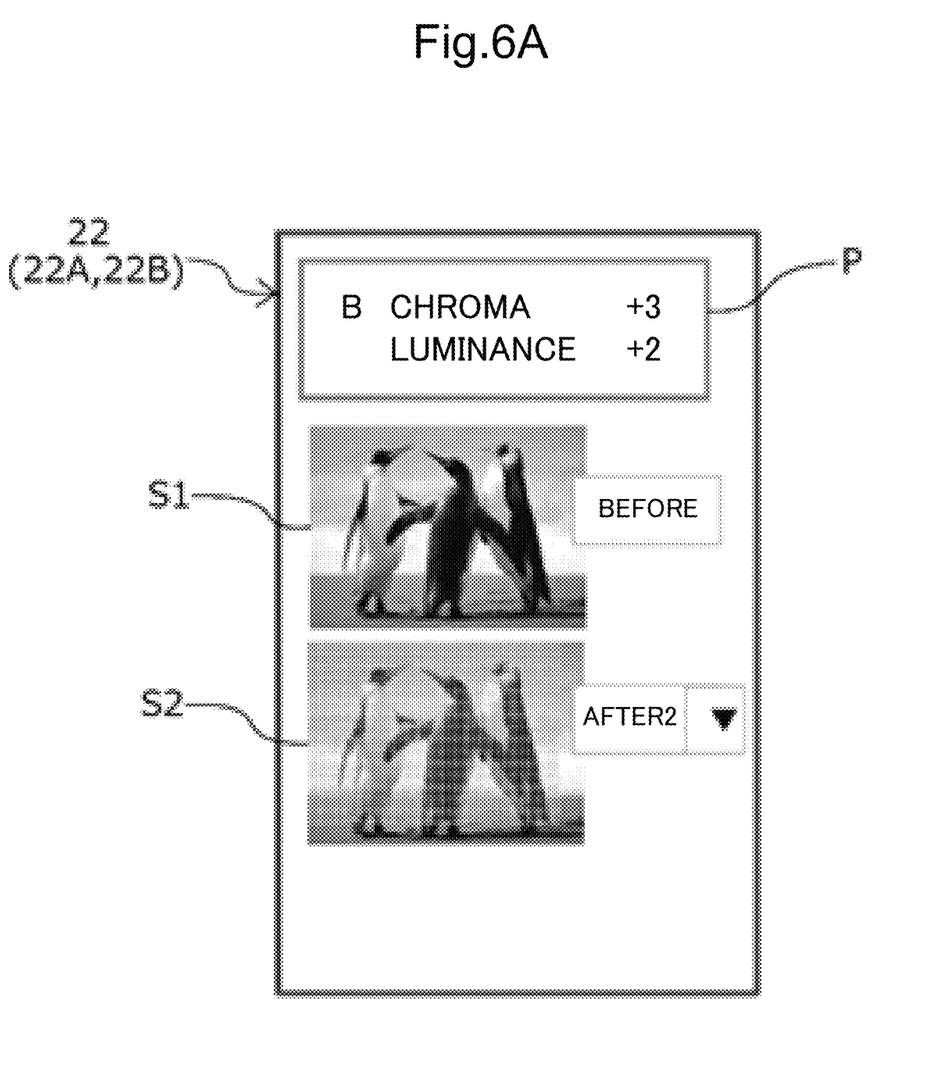
FIG. 6A is a schematic drawing showing a first example of a display on the part of the mobile terminal.

Hereunder, an operation of the mobile terminal 2, to be performed after recognizing the distinction image (Individual Code Q1, General Codes Q2 to Q4) and the corresponding setup information, will be described. As mentioned earlier, the display unit 22B of the mobile terminal 2 has high resolution, and also a desired portion of the image displayed on the display unit 22B can be easily enlarged. The control unit 20 causes the display unit 22B to display a plurality of images, formed by subjecting the sample images, selected according to the setup information, to the picture quality adjustment under different settings. One of such images may be the sample image subjected to the picture quality adjustment on the basis of the setup information recognized as above. Another image may be the default sample image as it is (not subject to any picture quality adjustment). FIG. 6A illustrates the display on the display unit 22B (touch panel display 22) according to the first example. In FIG. 6A, the sample image not subjected to any picture quality adjustment ("chroma", "luminance", "hue", and "temperature" are all set to "0") is displayed as a first image S1 (Before), in the upper region of the screen. In the lower region of the screen, the sample image subjected to the picture quality adjustment, using the combination B ("chroma" set to +3, "luminance" set to +2), is displayed as a second image S2 (After 2). The mentioned values of the parameters are displayed in a parameter display field P.

Now, in order to optimize the foregoing settings on the part of the image processing unit, it is often necessary for the user to input a plurality of types of settings with respect to the same image (image data), and to confirm the preview images respectively corresponding to the settings. To perform such a procedure with an existing image processing system, a series of operations including displaying the marker on the image processing unit, shooting the marker with the electronic device, and displaying the tentative preview image on the electronic device, has to be repeated each time a setting is inputted. Accordingly, with the existing image processing system, the operation to optimize the setting for the picture quality adjustment inevitably becomes complicated. Therefore, an image forming system that facilitates the optimization of the setting for the picture quality adjustment is desired.

With the arrangement according to this embodiment, in contrast, the user can easily recognize the difference between the images, by viewing both of the images at a time on the display unit 22B, and can easily decide the acceptability of the combination B.

Figure 6B:
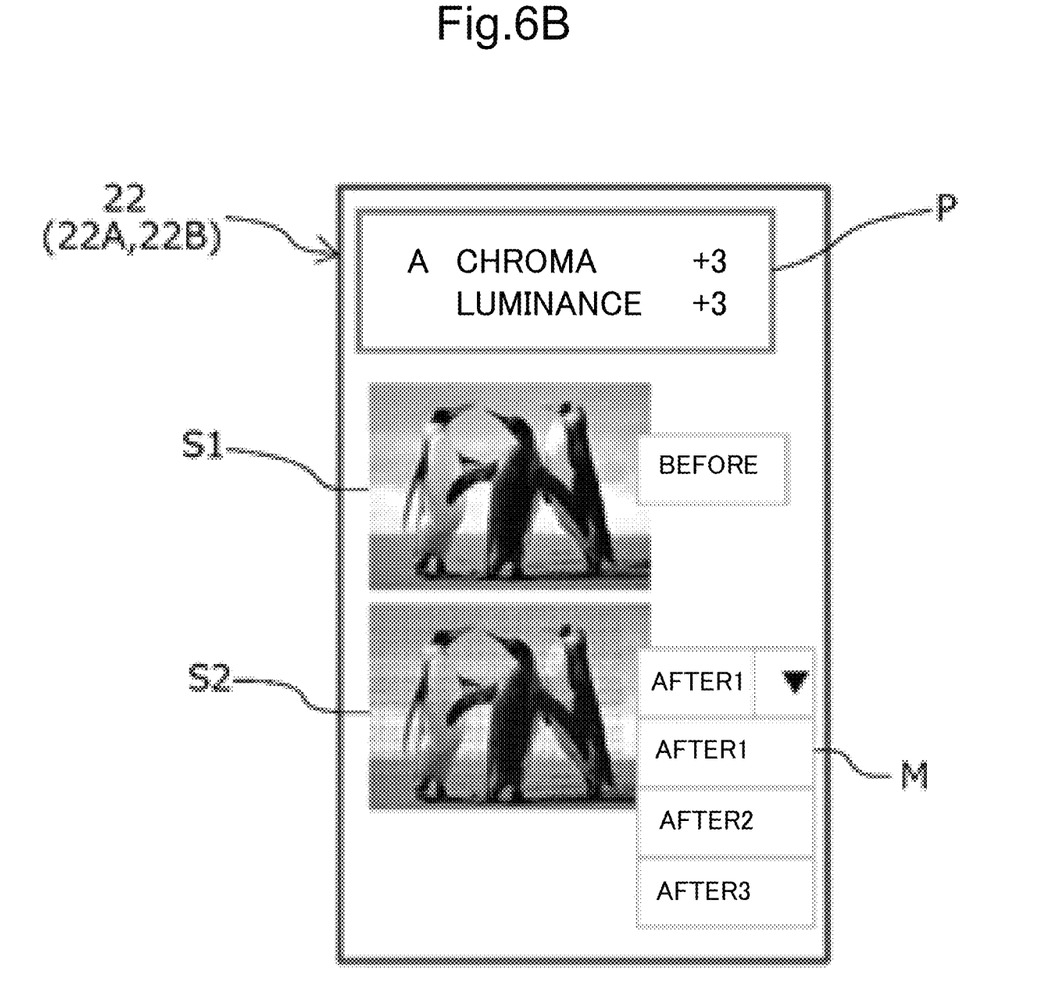
FIG. 6B is a schematic drawing showing a second example of the display on the part of the mobile terminal.

In addition, when the mobile terminal 2 acquires a plurality of setup conditions as above, all of the setup conditions can be stored in the storage unit 23, and the image data of the sample images subjected to the picture quality adjustment under the setup conditions can also be stored in the storage unit 23. Therefore, as shown in FIG. 6B representing the second example, the first image S1 may be displayed in the same way as FIG. 6A, and an image subjected to the picture quality adjustment under another setup condition can be selected for display, as the second image S2. FIG. 6B, which includes a pull-down menu M for selecting another sample image, represents an example where the image subjected to the picture quality adjustment based on the combination A (After 1) is displayed as the second image S2.

Figure 7A:
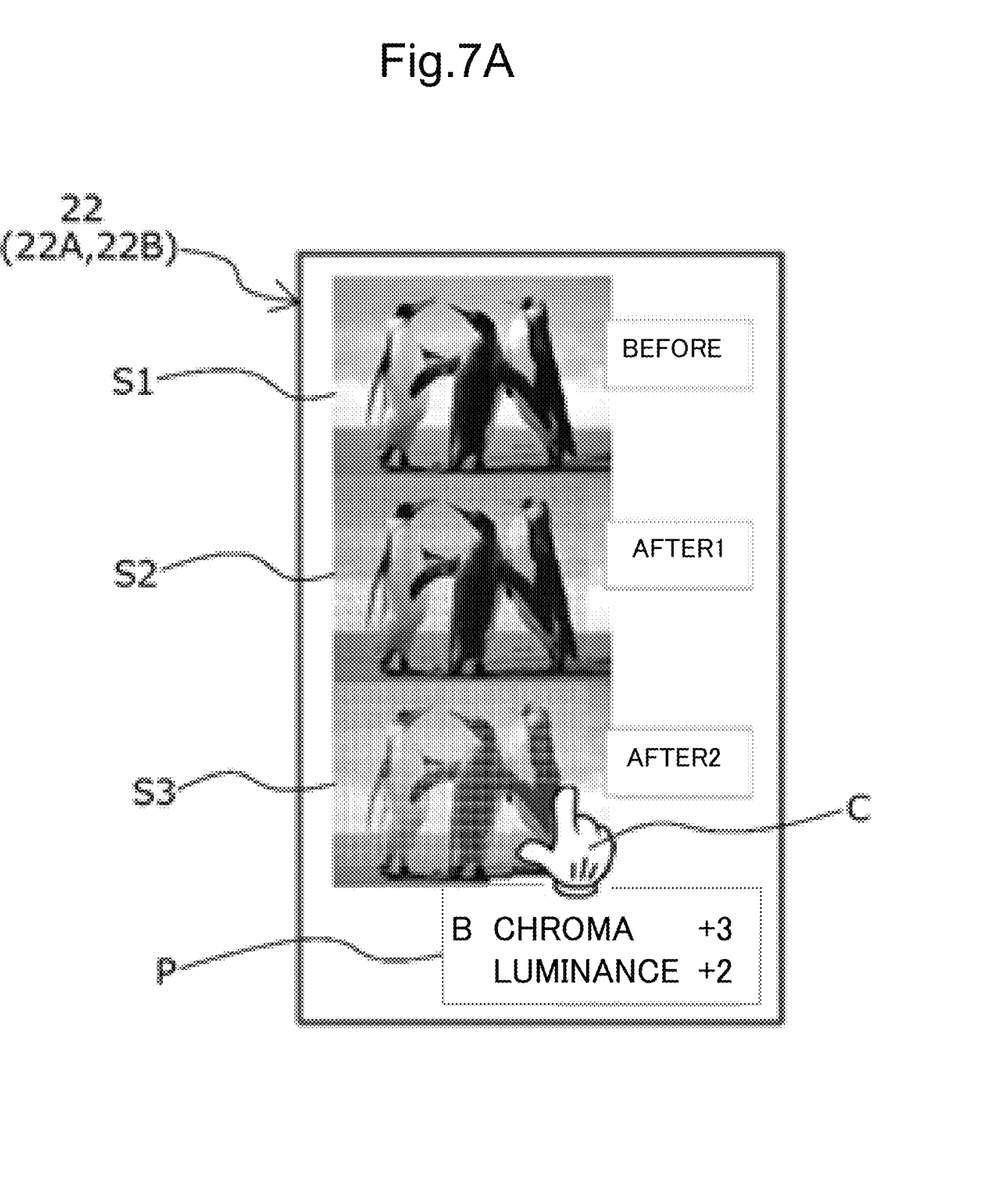
FIG. 7A is a schematic drawing showing a third example of the display on the part of the mobile terminal.

Since the display unit 22B has high resolution, three images may be displayed at a time, like a third example shown in FIG. 7A. In FIG. 7A, the image subjected to no picture quality adjustment (Before), like the first image S1 in FIG. 6A and FIG. 6B, is displayed in the uppermost region as the first image S1, the image similar to the second image S2 shown in FIG. 6B (After 1) is displayed in the second upper region as the second image S2, and the image similar to the second image S2 shown in FIG. 6A (After 2) is displayed in the lowermost region as a third image S3. In this case, for example, the setup condition corresponding to the image pointed by a cursor C, between the second image S2 (After 1) and the third image S3 (After 2), in other words the third image S3 in the example of FIG. 7A, may be displayed.

Figure 7B:
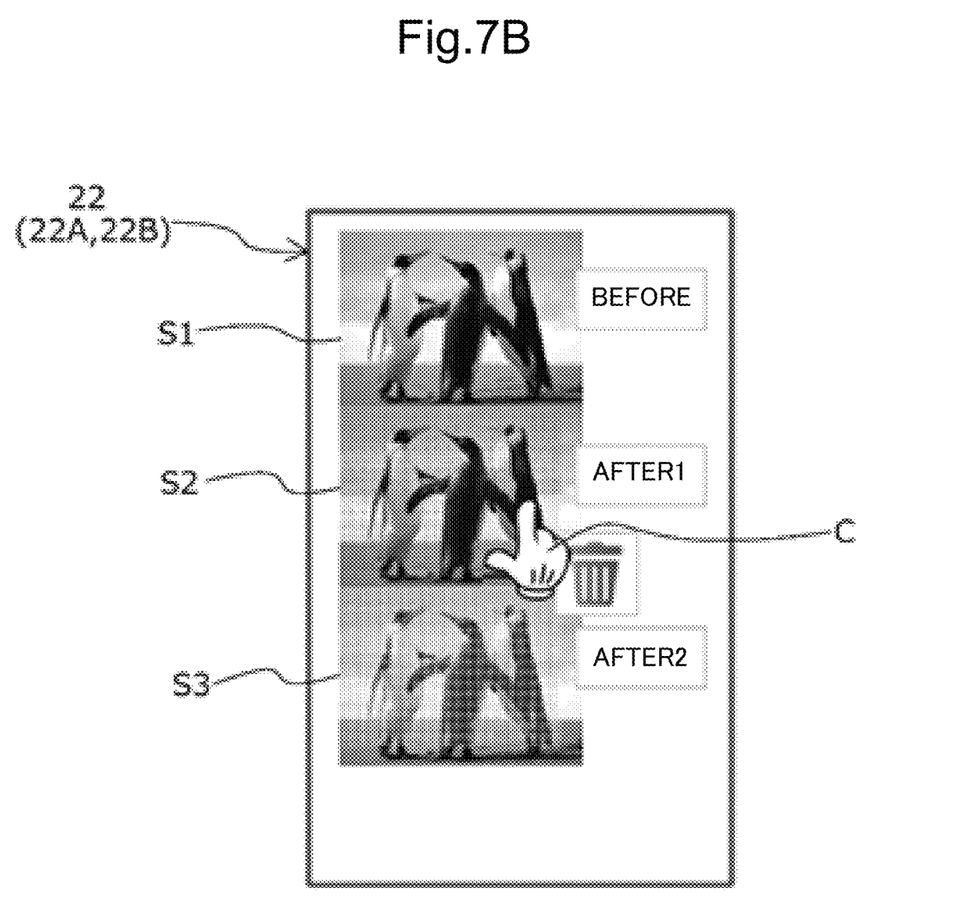
FIG. 7B is a schematic drawing showing a fourth example of the display on the part of the mobile terminal.

When a large number of setup conditions or images are stored in the storage unit 23, the data management becomes complicated. Accordingly, for example, when the cursor C is located on one of the second image S2 (After 1) and the third image S3 (After 2), and held down for a predetermined time, the image file of the pointed image and the corresponding setup condition may be deleted from the storage unit 23. FIG. 7B illustrates the display according to the fourth example, to which the mentioned arrangement is applicable, and represents the case where the second image S2 (After 1) is selected as the data to be deleted.

Further, in the case where the mobile terminal 2 and the image forming apparatus 1 are connected to each other via a network or short-range wireless communication, the user may select, with the cursor C, one of the plurality of images displayed similar to FIG. 7B, and the mobile terminal 2 may transmit a notice to the effect that the setup information corresponding to the selected image is selected, to the image forming apparatus 1.

Utilizing the mobile terminal 2 as above enables the picture quality adjustment to be optimally performed, when the image forming apparatus 1 is about to output an image.

The configuration of the mobile terminal 2 shown in FIG. 3 is similar to that of a popular smartphone, and a difference is only in the foregoing operation. Accordingly, the mobile terminal 2 described as above can easily be realized, by installing an application of the foregoing operation in an existing smartphone. Regarding the image forming apparatus 1 also, the aforementioned settings can be entered in the existing image forming apparatus, and the only difference from the existing image forming apparatus is the generation of the code image for distinction, and the displaying of the same on the display unit 13B. Therefore, the image forming apparatus 1 according to this embodiment can also be easily obtained, by installing a software for executing the foregoing operation in the existing image forming apparatus. Consequently, the image forming system 100 can be realized at a low cost.

Although the foregoing embodiment refers to the picture quality adjustment performed when the image forming apparatus 1 executes the copying function, the arrangement according to the embodiment is equally applicable to other functions, provided that the parameters for the picture quality adjustment can be set through the operation panel 13A (touch panel 13). In this case, the items to be set are not limited to those presented in FIG. 4A, and the types and numbers of the items may be determined as desired.

Further, although the mobile terminal (electronic device) 2 is exemplified by the smartphone in the foregoing embodiment, any desired apparatus may be employed as the mobile terminal, provided that the apparatus includes an imaging unit and a display unit having high resolution. Although the touch panel display, integrally constituted of the operation panel and the display unit, is employed in both of the image forming apparatus 1 and the mobile terminal 2, it suffices that, in both thereof, a display unit capable of performing the foregoing function is provided, and the operation panel and the display unit may be provided as separate components. Further, although the QR code is employed as the distinction image encoded from the setup information, in the foregoing embodiment, any desired format may be adopted, provided that the setup information can be converted to a distinction image (e.g., code information such as a one-dimensional code or two-dimensional code), and the distinction image representing the setup information can be displayed, so as to allow the imaging unit 21 to recognize the distinction image.

While the present disclosure has been described in detail with reference to the embodiments thereof, it would be apparent to those skilled in the art the various changes and modifications may be made therein within the scope defined by the appended claims.

What is claimed is:

1. An electronic device comprising:
   a storage unit that stores a plurality of sample images;
   an imaging unit that acquires one distinction image, visualized from setup information including a first combination and a second combination in which set values set by a user, with respect to a plurality of types of parameters for picture quality adjustment to be performed by an image forming apparatus, is different from each other, and information for specifying one of the plurality of sample images;
   a display;
   an operation panel; and
   a control unit including a processor, and configured to recognize, when the processor executes a control program, the setup information on a basis of the one distinction image acquired by the imaging unit, specify one of the plurality of sample images stored in the storage unit on a basis of the information included in the setup information, and cause the display to display, in a same screen, a first image formed by subjecting the specified sample image to the picture quality adjustment based on the first combination included in the setup information, a second image formed by subjecting the specified sample image to the picture quality adjustment based on the second combination included in the setup information, and the specified sample image not subjected to the picture quality adjustment, and
   when receiving through the operation panel an instruction for selecting the first image, the control unit causes the display to display a setup condition indicating the first combination, and when receiving through the operation panel an instruction for selecting the second image, the control unit causes the display to display a setup condition indicating the second combination.

2. The electronic device according to claim 1, wherein the imaging unit acquires a QR code (registered trademark) as the distinction image.

3. The electronic device according to claim 1, wherein the operation panel and the display are integrated into a touch panel display.

4. The electronic device according to claim 1, wherein the control unit
   stores a first image file indicating the first image and a second image file indicating the second image in the storage unit,
   when receiving a predetermined operation on the first image through the operation panel, deletes the first image file from the storage unit, and
   when receiving a predetermined operation on the second image through the operation panel, deletes the second image file from the storage unit.

5. An image forming system comprising:
   an image forming apparatus; and
   an electronic device,
   the image forming apparatus including:
      an image forming unit that forms an image on a recording medium;
      a first operation panel;
      a first display; and
      a first control unit including a processor, and configured to generate, when the processor executes a control program, one distinction image, visualized from setup information including a first combination and a second combination in which set values set by a user through the first operation panel, with respect to a plurality of types of parameters for picture quality adjustment to be performed by an image forming apparatus, is different from each other, and information for specifying one of the plurality of sample images, and cause the first display to display the one distinction image, and
   the electronic device including:
      a storage unit that stores a plurality of sample images;
      an imaging unit that acquires the one distinction image displayed on the first display;
      a second display;
      a second operation panel; and
      a second control unit including a processor, and configured to recognize, when the processor executes a control program, the setup information on a basis of the one distinction image acquired by the imaging unit, specify one of the plurality of sample images stored in the storage unit on a basis of the information included in the setup information, and cause the second display to display, in a same screen, a first image formed by subjecting the specified sample image to the picture quality adjustment based on the first combination included in the setup information, a second image formed by subjecting the specified sample image to the picture quality adjustment based on the second combination included in the setup information, and the specified sample image not subjected to the picture quality adjustment,
wherein when receiving through the second operation panel an instruction for selecting the first image, the second control unit causes the second display to display a setup condition indicating the first combination, and when receiving through the second operation panel an instruction for selecting the second image, the second control unit causes the second display to display a setup condition indicating the second combination.

\* \* \* \* \*